US007463946B2

(12) United States Patent
Smith et al.

(10) Patent No.: US 7,463,946 B2
(45) Date of Patent: Dec. 9, 2008

(54) MAIL HANDLING EQUIPMENT AND METHODS

(75) Inventors: Scott J. Smith, Fremont, NE (US); Jeffrey G. Nowlin, Council Bluffs, IA (US); Bruce A. Bennett, Omaha, NE (US); Ronald L. Prchal, Plattsmouth, NE (US)

(73) Assignee: First Data Corporation, Englewood, CO (US)

( * ) Notice: Subject to any disclaimer, the term of this patent is extended or adjusted under 35 U.S.C. 154(b) by 529 days.

(21) Appl. No.: 11/152,682

(22) Filed: Jun. 13, 2005

(65) Prior Publication Data

US 2005/0261801 A1 Nov. 24, 2005

Related U.S. Application Data

(63) Continuation of application No. 10/731,189, filed on Dec. 8, 2003, now Pat. No. 6,974,034, which is a continuation of application No. 10/036,653, filed on Nov. 8, 2001, now Pat. No. 6,670,569.

(51) Int. Cl.
*G06F 7/00* (2006.01)
*B07C 5/02* (2006.01)

(52) U.S. Cl. ......................... 700/221; 209/3.3; 700/213

(58) Field of Classification Search .................. 209/3.3, 209/584; 700/221; 270/52.13
See application file for complete search history.

(56) References Cited

U.S. PATENT DOCUMENTS 3,599,151 A 8/1971 Harr (Continued)

FOREIGN PATENT DOCUMENTS

EP 0 481 135 A1 4/1992

(Continued)

OTHER PUBLICATIONS

Amerinet, Inc., "Debit-it!—The Best Idea In Payment Systems Since the Credit Card", downloaded from website http://www.debit-it.com/ on Feb. 7, 2000, 8 pages.

(Continued)

*Primary Examiner*—Gene O. Crawford
*Assistant Examiner*—Ramya G Prakasam
(74) *Attorney, Agent, or Firm*—Townsend and Townsend and Crew LLP

(57) ABSTRACT

A mail processing machine comprises a first holding location that is adapted to hold a stack of first pages. A card is coupled to each of the first pages, and each first page includes an identifier. A second holding location is adapted to hold a stack of second pages that each have an identifier. A first advancing mechanism is adapted to separately advance each first page from the stack, and a second advancing mechanism is adapted to separately advance each second page from the stack. First and second scanning devices read the identifiers on the first and second pages upon their advancement. A controller is configured to control the first and second advancing mechanism to permit the first and second pages to be scanned by the first and second scanners and to match the first pages with the second pages if the identifier on one of the advanced first pages corresponds with the identifier on one of the advanced second pages.

23 Claims, 6 Drawing Sheets

U.S. PATENT DOCUMENTS

| | | | | |
|---|---|---|---|---|
| 3,783,755 | A | | 1/1974 | Lagin |
| 3,833,395 | A | | 9/1974 | Gosnell |
| 4,032,931 | A | | 6/1977 | Haker |
| 4,321,672 | A | | 3/1982 | Braun et al. |
| 4,429,217 | A | * | 1/1984 | Hill et al. .................... 235/380 |
| 4,454,414 | A | | 6/1984 | Benton |
| 4,562,340 | A | | 12/1985 | Tateisi et al. |
| 4,562,341 | A | | 12/1985 | Ohmae et al. |
| 4,630,200 | A | | 12/1986 | Ohmae et al. |
| 4,678,895 | A | | 7/1987 | Tateisi et al. |
| 4,722,554 | A | | 2/1988 | Pettit |
| 4,812,628 | A | | 3/1989 | Boston et al. |
| 4,902,881 | A | | 2/1990 | Janku |
| 4,961,142 | A | | 10/1990 | Elliott et al. |
| 4,972,318 | A | | 11/1990 | Brown et al. |
| 5,021,967 | A | | 6/1991 | Smith |
| 5,053,607 | A | | 10/1991 | Carlson et al. |
| 5,067,088 | A | * | 11/1991 | Schneiderhan .............. 700/221 |
| 5,119,293 | A | | 6/1992 | Hammond |
| 5,175,682 | A | | 12/1992 | Higashiyama et al. |
| 5,220,501 | A | | 6/1993 | Lawlor et al. |
| 5,283,829 | A | | 2/1994 | Anderson |
| 5,350,906 | A | | 9/1994 | Brody et al. |
| 5,367,452 | A | | 11/1994 | Gallery et al. |
| 5,388,315 | A | * | 2/1995 | Jones ........................ 24/712.1 |
| 5,408,077 | A | | 4/1995 | Campo et al. |
| 5,426,594 | A | | 6/1995 | Wright et al. |
| 5,448,043 | A | | 9/1995 | Nakano et al. |
| 5,461,217 | A | | 10/1995 | Claus |
| 5,464,971 | A | | 11/1995 | Sutcliffe et al. |
| 5,465,206 | A | | 11/1995 | Hilt et al. |
| 5,477,037 | A | | 12/1995 | Berger |
| 5,477,038 | A | | 12/1995 | Levine et al. |
| 5,484,988 | A | | 1/1996 | Hills et al. |
| 5,491,325 | A | | 2/1996 | Huang et al. |
| 5,504,677 | A | | 4/1996 | Pollin |
| 5,510,979 | A | | 4/1996 | Moderi et al. |
| 5,513,117 | A | | 4/1996 | Small |
| 5,524,073 | A | | 6/1996 | Stambler |
| 5,555,496 | A | | 9/1996 | Tackbary et al. |
| 5,570,465 | A | | 10/1996 | Tsakanikas |
| 5,577,109 | A | | 11/1996 | Stimson et al. |
| 5,604,802 | A | | 2/1997 | Holloway |
| 5,622,388 | A | | 4/1997 | Alcordo |
| 5,629,982 | A | | 5/1997 | Micali |
| 5,638,283 | A | | 6/1997 | Herbert |
| 5,649,117 | A | | 7/1997 | Landry |
| 5,650,604 | A | | 7/1997 | Marcous et al. |
| 5,657,201 | A | | 8/1997 | Kochis |
| 5,677,955 | A | | 10/1997 | Doggett et al. |
| 5,679,940 | A | | 10/1997 | Templeton et al. |
| 5,699,528 | A | | 12/1997 | Hogan |
| 5,717,868 | A | | 2/1998 | James |
| 5,721,768 | A | | 2/1998 | Stimson et al. |
| 5,732,136 | A | | 3/1998 | Murphree et al. |
| 5,732,400 | A | | 3/1998 | Mandler et al. |
| 5,737,438 | A | | 4/1998 | Zlotnick et al. |
| 5,745,886 | A | | 4/1998 | Rosen |
| 5,757,917 | A | | 5/1998 | Rose et al. |
| 5,764,888 | A | | 6/1998 | Bolan et al. |
| 5,774,879 | A | | 6/1998 | Custy et al. |
| 5,778,067 | A | | 7/1998 | Jones et al. |
| 5,779,379 | A | | 7/1998 | Mason et al. |
| 5,783,808 | A | | 7/1998 | Josephson |
| 5,787,403 | A | | 7/1998 | Randle |
| 5,794,207 | A | | 8/1998 | Walker et al. |
| 5,815,657 | A | | 9/1998 | Williams et al. |
| 5,825,617 | A | | 10/1998 | Kochis et al. |
| 5,826,241 | A | | 10/1998 | Stein et al. |
| 5,828,875 | A | | 10/1998 | Halvarsson et al. |
| 5,832,463 | A | | 11/1998 | Funk |
| 5,870,718 | A | | 2/1999 | Spector |
| 5,875,435 | A | | 2/1999 | Brown |
| 5,878,211 | A | | 3/1999 | Delagrange et al. |
| 5,880,446 | A | | 3/1999 | Mori et al. |
| 5,893,080 | A | | 4/1999 | McGurl et al. |
| 5,896,298 | A | | 4/1999 | Richter |
| 5,897,625 | A | | 4/1999 | Gustin et al. |
| 5,897,989 | A | | 4/1999 | Beecham |
| 5,898,154 | A | | 4/1999 | Rosen |
| 5,899,980 | A | | 5/1999 | Wilf et al. |
| 5,899,982 | A | | 5/1999 | Randle |
| 5,902,983 | A | | 5/1999 | Crevelt et al. |
| 5,903,881 | A | | 5/1999 | Schrader et al. |
| 5,909,492 | A | | 6/1999 | Payne et al. |
| 5,909,673 | A | | 6/1999 | Gregory |
| 5,910,988 | A | | 6/1999 | Ballard |
| 5,913,202 | A | | 6/1999 | Motoyama |
| 5,915,023 | A | | 6/1999 | Bernstein |
| 5,920,629 | A | | 7/1999 | Rosen |
| 5,920,847 | A | | 7/1999 | Kolling et al. |
| 5,920,848 | A | | 7/1999 | Schutzer et al. |
| 5,937,396 | A | | 8/1999 | Konya |
| 5,949,044 | A | | 9/1999 | Walker et al. |
| 5,952,639 | A | | 9/1999 | Ohki et al. |
| 5,953,709 | A | | 9/1999 | Gilbert et al. |
| 5,953,710 | A | | 9/1999 | Fleming |
| 5,960,412 | A | | 9/1999 | Tackbary et al. |
| 5,963,647 | A | | 10/1999 | Downing et al. |
| 5,974,146 | A | | 10/1999 | Randle et al. |
| 5,974,194 | A | | 10/1999 | Tackbary et al. |
| RE36,365 | E | | 11/1999 | Levine et al. |
| 5,987,426 | A | | 11/1999 | Goodwin, III |
| 5,993,047 | A | | 11/1999 | Novogrod et al. |
| 5,999,624 | A | | 12/1999 | Hopkins |
| 6,003,763 | A | | 12/1999 | Gallagher et al. |
| 6,011,833 | A | | 1/2000 | West |
| 6,012,048 | A | | 1/2000 | Gustin et al. |
| 6,015,087 | A | | 1/2000 | Seifert et al. |
| 6,027,216 | A | | 2/2000 | Guyton |
| 6,029,150 | A | | 2/2000 | Kravitz |
| 6,030,000 | A | | 2/2000 | Diamond |
| 6,032,133 | A | | 2/2000 | Hilt et al. |
| 6,032,137 | A | | 2/2000 | Ballard |
| 6,035,285 | A | | 3/2000 | Schlect et al. |
| 6,035,406 | A | | 3/2000 | Moussa et al. |
| 6,039,245 | A | | 3/2000 | Symonds et al. |
| 6,039,250 | A | | 3/2000 | Ito et al. |
| 6,044,360 | A | | 3/2000 | Picciallo |
| 6,044,362 | A | | 3/2000 | Neely |
| 6,045,039 | A | | 4/2000 | Stinson et al. |
| 6,058,417 | A | | 5/2000 | Hess et al. |
| 6,064,990 | A | | 5/2000 | Goldsmith |
| 6,070,150 | A | | 5/2000 | Remington et al. |
| 6,070,156 | A | | 5/2000 | Hartsell, Jr. |
| 6,070,798 | A | | 6/2000 | Nethery |
| 6,078,907 | A | | 6/2000 | Lamm |
| 6,081,790 | A | | 6/2000 | Rosen |
| 6,088,683 | A | | 7/2000 | Jalili |
| 6,088,684 | A | | 7/2000 | Custy et al. |
| 6,097,834 | A | | 8/2000 | Krouse et al. |
| 6,098,053 | A | | 8/2000 | Slater |
| 6,106,020 | A | | 8/2000 | Leef et al. |
| 6,119,106 | A | | 9/2000 | Mersky et al. |
| 6,119,931 | A | | 9/2000 | Novogrod |
| 6,122,625 | A | | 9/2000 | Rosen |
| 6,128,603 | A | | 10/2000 | Dent et al. |
| 6,134,561 | A | | 10/2000 | Brandien et al. |
| 6,145,738 | A | | 11/2000 | Stinson et al. |
| 6,148,377 | A | | 11/2000 | Carter et al. |
| 6,149,056 | A | | 11/2000 | Stinson et al. |
| 6,164,528 | A | | 12/2000 | Hills et al. |
| 6,167,386 | A | | 12/2000 | Brown |
| 6,175,823 | B1 | | 1/2001 | Van Dusen |

| | | | |
|---|---|---|---|
| 6,189,787 | B1 | 2/2001 | Dorf |
| 6,193,152 | B1 | 2/2001 | Fernando et al. |
| 6,199,761 | B1 | 3/2001 | Drexler |
| 6,202,005 | B1 | 3/2001 | Mahaffey |
| 6,202,054 | B1 | 3/2001 | Lawlor et al. |
| 6,206,283 | B1 | 3/2001 | Bansal et al. |
| RE37,122 | E | 4/2001 | Levine et al. |
| 6,223,168 | B1 | 4/2001 | McGurl et al. |
| 6,246,996 | B1 | 6/2001 | Stein et al. |
| 6,247,047 | B1 | 6/2001 | Wolff |
| 6,260,024 | B1 | 7/2001 | Shkedy |
| 6,263,446 | B1 | 7/2001 | Kausik et al. |
| 6,269,369 | B1 | 7/2001 | Robertson |
| 6,275,829 | B1 | 8/2001 | Angiulo et al. |
| 6,286,756 | B1 | 9/2001 | Stinson et al. |
| 6,289,322 | B1 | 9/2001 | Kitchen et al. |
| 6,292,709 | B1 | 9/2001 | Uhl et al. |
| 6,292,789 | B1 | 9/2001 | Schutzer |
| 6,305,604 | B1 | 10/2001 | Ono |
| 6,308,887 | B1 | 10/2001 | Korman et al. |
| 6,314,169 | B1 | 11/2001 | Schelberg, Jr. et al. |
| 6,317,745 | B1 | 11/2001 | Thomas et al. |
| 6,321,211 | B1 | 11/2001 | Dodd |
| 6,321,984 | B1 | 11/2001 | McCall et al. |
| 6,327,570 | B1 | 12/2001 | Stevens |
| 6,327,575 | B1 | 12/2001 | Katz |
| 6,343,279 | B1 | 1/2002 | Bissonette et al. |
| 6,347,305 | B1 | 2/2002 | Watkins |
| 6,360,254 | B1 | 3/2002 | Linden et al. |
| 6,367,693 | B1 | 4/2002 | Novogrod |
| 6,394,343 | B1 | 5/2002 | Berg et al. |
| 6,408,284 | B1 | 6/2002 | Hilt et al. |
| 6,411,942 | B1 | 6/2002 | Fujimoto |
| 6,415,271 | B1 | 7/2002 | Turk et al. |
| 6,438,586 | B1 | 8/2002 | Hass et al. |
| 6,449,599 | B1 | 9/2002 | Payne et al. |
| 6,453,300 | B2 | 9/2002 | Simpson |
| 6,473,500 | B1 | 10/2002 | Risafi et al. |
| 6,484,936 | B1 | 11/2002 | Nicoll et al. |
| 6,488,203 | B1 | 12/2002 | Stoutenburg et al. |
| 6,502,747 | B1 | 1/2003 | Stoutenburg et al. |
| 6,510,453 | B1 | 1/2003 | Apfel et al. |
| 6,539,363 | B1 | 3/2003 | Allgeier et al. |
| 6,547,132 | B1 | 4/2003 | Templeton et al. |
| 6,549,119 | B1 | 4/2003 | Turner |
| 6,554,184 | B1 | 4/2003 | Amos |
| 6,609,113 | B1 | 8/2003 | O'Leary et al. |
| RE38,255 | E | 9/2003 | Levine et al. |
| 6,618,705 | B1 | 9/2003 | Wang et al. |
| 6,736,314 | B2 | 5/2004 | Cooper et al. |
| 6,761,309 | B2 | 7/2004 | Stoutenburg et al. |
| 6,761,311 | B1 | 7/2004 | Algiene et al. |
| 6,814,282 | B2 | 11/2004 | Seifert et al. |
| 6,827,260 | B2 | 12/2004 | Stoutenburg et al. |
| 6,829,588 | B1 | 12/2004 | Stoutenburg et al. |
| 6,847,947 | B1 | 1/2005 | Kambour et al. |
| 6,886,742 | B2 | 5/2005 | Stoutenburg et al. |
| 6,908,031 | B2 | 6/2005 | Seifert et al. |
| 6,922,673 | B2 | 7/2005 | Karas et al. |
| 2001/0042785 | A1 | 11/2001 | Walker et al. |
| 2001/0051876 | A1 | 12/2001 | Seigel et al. |
| 2001/0054003 | A1 | 12/2001 | Chien et al. |
| 2002/0023055 | A1 | 2/2002 | Antognini et al. |
| 2002/0046106 | A1 | 4/2002 | Ishibashi et al. |
| 2002/0062285 | A1 | 5/2002 | Amann |
| 2002/0087462 | A1 | 7/2002 | Stoutenburg et al. |
| 2002/0087463 | A1 | 7/2002 | Fitzgerald et al. |
| 2002/0087467 | A1 | 7/2002 | Muscavage et al. |
| 2002/0104026 | A1 | 8/2002 | Barra et al. |
| 2002/0111908 | A1 | 8/2002 | Milberger et al. |
| 2002/0152168 | A1 | 10/2002 | Neofytides et al. |
| 2002/0152176 | A1 | 10/2002 | Neofytides et al. |
| 2002/0153414 | A1 | 10/2002 | Stoutenburg et al. |
| 2002/0161702 | A1 | 10/2002 | Milberger et al. |
| 2003/0024979 | A1 | 2/2003 | Hansen et al. |
| 2003/0028491 | A1 | 2/2003 | Cooper |
| 2003/0055780 | A1 | 3/2003 | Hansen et al. |
| 2003/0069856 | A1 | 4/2003 | Seifert et al. |
| 2003/0111529 | A1 | 6/2003 | Templeton et al. |
| 2003/0120777 | A1 | 6/2003 | Thompson et al. |
| 2003/0126036 | A1 | 7/2003 | Mascavage et al. |
| 2003/0126075 | A1 | 7/2003 | Mascavage et al. |
| 2003/0126083 | A1 | 7/2003 | Seifert et al. |
| 2003/0130907 | A1 | 7/2003 | Karas et al. |
| 2003/0130940 | A1 | 7/2003 | Hansen et al. |
| 2003/0130948 | A1 | 7/2003 | Algiene et al. |
| 2003/0135459 | A1 | 7/2003 | Abelman et al. |
| 2003/0149662 | A1 | 8/2003 | Shore |
| 2003/0154164 | A1 | 8/2003 | Mascavage et al. |
| 2003/0167237 | A1 | 9/2003 | Degen et al. |
| 2003/0177067 | A1 | 9/2003 | Cowell et al. |
| 2003/0187789 | A1 | 10/2003 | Karas et al. |
| 2003/0187791 | A1 | 10/2003 | Weichert et al. |
| 2003/0187792 | A1 | 10/2003 | Hansen et al. |
| 2003/0195811 | A1 | 10/2003 | Hayes et al. |
| 2003/0208445 | A1 | 11/2003 | Compiano |
| 2003/0222135 | A1 | 12/2003 | Stoutenburg et al. |
| 2003/0222136 | A1 | 12/2003 | Bolle et al. |
| 2003/0225689 | A1 | 12/2003 | MacFarlane et al. |
| 2004/0015438 | A1 | 1/2004 | Compiano |
| 2004/0024701 | A1 | 2/2004 | Hansen et al. |
| 2004/0059672 | A1 | 3/2004 | Baig et al. |
| 2004/0068437 | A1 | 4/2004 | McGee et al. |
| 2004/0078327 | A1 | 4/2004 | Frazier et al. |
| 2004/0088248 | A1 | 5/2004 | Cutler |
| 2004/0088261 | A1 | 5/2004 | Moore et al. |
| 2004/0098328 | A1 | 5/2004 | Grant et al. |
| 2004/0098335 | A1 | 5/2004 | Michelsen |
| 2004/0107165 | A1 | 6/2004 | Blair et al. |
| 2004/0117302 | A1 | 6/2004 | Weichert et al. |
| 2004/0138947 | A1 | 7/2004 | McGee et al. |
| 2004/0139008 | A1 | 7/2004 | Muscavage et al. |
| 2004/0143552 | A1 | 7/2004 | Weichert et al. |
| 2004/0148286 | A1 | 7/2004 | Rogers |
| 2004/0153398 | A1 | 8/2004 | Baumgartner et al. |
| 2004/0158521 | A1 | 8/2004 | Newton et al. |
| 2004/0167860 | A1 | 8/2004 | Baxter et al. |
| 2004/0193897 | A1 | 9/2004 | Van Volkenburgh |
| 2004/0210476 | A1 | 10/2004 | Blair et al. |
| 2004/0210506 | A1 | 10/2004 | Algiene et al. |
| 2004/0210521 | A1 | 10/2004 | Crea et al. |
| 2004/0210523 | A1 | 10/2004 | Gains et al. |
| 2004/0211831 | A1 | 10/2004 | Stoutenburg et al. |
| 2004/0254833 | A1 | 12/2004 | Algiene et al. |
| 2005/0017067 | A1 | 1/2005 | Weinberger |
| 2005/0167481 | A1 | 8/2005 | Hansen et al. |
| 2005/0180550 | A1 | 8/2005 | McGee et al. |
| 2005/0187929 | A1 | 8/2005 | Staggs |
| 2005/0209958 | A1 | 9/2005 | Michelsen |
| 2005/0209961 | A1 | 9/2005 | Michelsen |

FOREIGN PATENT DOCUMENTS

| | | | |
|---|---|---|---|
| EP | 0 745 961 | A2 | 4/1996 |
| EP | 0 745 961 | A3 | 7/1998 |
| EP | 0 949 596 | A2 | 10/1999 |
| EP | 1 077 436 | A2 | 2/2001 |
| FR | 2728983 | A1 | 7/1996 |
| WO | WO 96/26508 | A1 | 8/1996 |
| WO | WO 98/49644 | A1 | 11/1998 |
| WO | WO 98/50875 | A2 | 11/1998 |
| WO | WO 99/22291 | A1 | 5/1999 |
| WO | WO 99/28872 | A1 | 6/1999 |
| WO | WO 00/22559 | A1 | 4/2000 |
| WO | WO 00/46725 | A1 | 8/2000 |
| WO | WO 00/54122 | A2 | 9/2000 |

| | | | |
|---|---|---|---|
| WO | WO 00/67177 | A2 | 11/2000 |
| WO | WO 00/79452 | A2 | 12/2000 |
| WO | WO 01/04816 | A1 | 1/2001 |
| WO | WO 01/39093 | A1 | 5/2001 |
| WO | WO 02/05195 | A1 | 1/2002 |

OTHER PUBLICATIONS

Business Wire, "*E-Commerce, Email and E-greeting Cards Combine in New Web Site Designed by Interactive Bureau*", Sep. 14, 1999 (abstract), [online][retrieved on May 1, 2002], retrieved from Proquest Database, 2 pages.
Business Wire, "E-Commerce, Email and E-greeting Cards Combine in New Web Site Designed by Interactive Bureau; Flooz.com Features a Fun Online Gift Currency You Send by Email for Any Occasion", downloaded from website http://www.proquest.umi.com.
Confinity, Inc., *PayPal.com, How PayPal.com Works*, downloaded from website http://www.paypal.com on Feb. 7, 2000, 7 pages.
Dotbank, *The Way to Send and Receive Money on the Internet*, downloaded from website http://dotbank.com, Feb. 7, 2000, 6 pages.
http://www.vfi-finance.com/tranz330.htm, Tranz 330 Fast, Low-Cost Transaction Automation At The Point Of Service, VeriFone Finance, Jan. 1999, pp. 1-3, especially pp. 1-2.
IDEALAB Company, PayMe.com, downloaded from website http://ssl.idealab.com on Feb. 16, 2000, 7 pages.
Intell-A-Check Corp.: "Intell-A-Check! -The Way to get Paid", Intell-A-Check product overview, retrieved from http://www.icheck.com/ on Feb. 7, 2000, 7 pages.
Karpinski, R. "Web Merchants Try Debit Cards and Gift Certificates to Spur Sales" InternetWeek, Oct. 11, 1999, 2 pages.
Lawton, George; "Biometrics: A New Era in Security"; 1998, Computer, vol. 31, No. 8, pp. 16-18.
New commercial services from Western Union allow businesses to directly transfer money internationally; User companies can now send or receive money at their own offices through on-line connection to world's largest international money transfer network. Business Wire. Oct. 16, 1995, p. 1.
Russo, R. "Omaha's Giftpoint.com Draws $5 Million Investment", Omaha World, Dec. 14, 1999, 2 pages.
Stockel, Anna; "Securing Data and Financial Transactions"; 1995, Institute of Electrical and Electronics Engineers 29th Annual Conference, pp. 397-401.
PR Newswire, "GiftSpot.com Simplifies Gift-Giving on the Internet," Oct. 20, 1999 (abstract), [online] [retrieved on May 1, 2002], retrieved from Proquest Database, 5 pages.
TeleCheck International, Inc.: "Making Checks Our Responsibility", retrieved from http://www.telecheck.com/home/home.html on Feb. 7, 2000, 8 pages.
Transpoint, "The Way to Pay Online", downloaded from website http://www.transpoint.com/ on Feb. 10, 2000, 12 pages.
Walker, L. "Click a Card", The Washington Post, Dec. 16, 1999, 3 pages.
Website "eCount" at http://www.ecount.com.
Website: "Billpoint" at http://www.billpoint.com.
Website: "eMoneyMail" at http://www.emoneymail.com.
Website: "I-Escrow" at http://www.iescrow.com.
Website: "PayMe.com" at http://www.payme.com.
Website: "PayMyBills.com" at http://www/paymybills.com.
Website: "PayPal" at http://www.paypal.com.
Website: "Tradesafe.com" at http://www.tradesafe.com.
x.com, Do More with Your Money, downloaded from website http://www.x.com., Feb. 7, 2000, 5 pages.
http://news.firstdata.com/media/ReleaseDetail.cfm?ReleaseID=849995>.
Press Release: "Western Union Announces ATM Card Payout for Money Transfer Transactions"; 2001, URL: http://news.firstdata.com/m edia/ReleaseDetail.cfm?ReleaseID=849995>.
Levin, Gary; "Western Union not fading into sunset; new services are added as telegrams drop"; 1992, 2 pages.
"Quick Collect"; Western Union Training Guide; 2004, 10 pages.
"Send your payment using Western Union Quick Collect"; 2 pages.
"Purchasing American Airlines Tickets Just Got Easier"; 2005, 4 pages.
"Lan Airline Alliance Carriers and Western Union Offer Travelers Additional Payment Options"; 2005, 3 pages.
Quick Collect: Government/Child Support Agency Name, Training Guide; 2004, 7 pages.
"Western Union Quick Collect; 3 Easy Ways to Send a Payment: In Person, Online or by Phone!"; 2 pages.
"Western Union: Now, using our service is even more rewarding"; 1 page.
"To send a Quick Collect Payment"; sample form, 1 page.
"Western Union: Some Quick Facts about Quick Collect"; 1 page.
"Quick Collect Sales Presentation"; 28 pages.
"Western Union Quick Collect"; 2 pages.
"Why Send Your Customers Across Town When You Can Send Them Next Door?"; 2005, 1 page.
"There's a lot to be said about the many advantages of the Quick Collect service. And look who's saying it."; 4 pages.
"If you're not getting your payment with Quick Collect, chances are you're not getting it"; 2001, 2 pages.
"Western Union: Ford Credit Phone Pay-How does it work?", 2001, 1 page.
Western Union Quick Collect: The Fastest way to collect good funds; 1999, 11 pages.
"Only Western Union"; 2 pages.
"Announcing Quick Collect Online"; 2002, Western Union's Professional Collector, 3 pages.
"When you're helping a customer make a crucial payment there's no room for guesswork"; 2002, Western Union's Professional Collector, 3 pages.
"Western Union Quick Collect: The most agents, the most locations, the most experienced"; 2000, 2 pages.
"It takes a certain person to make a good collector. But it takes a good manager to make a champion"; 2001, Western Union's Professional Collector, 3 pages.
"Nationwide Credit Collectors Act Globally"; 2001, Western Union's Professional Collector, 3 pages.
"Guess What? The check's not in the mail"; 2001, Western Union's Professional Collector, 3 pages.
"Quick Cash and Quick Collect: Western Union's money-movers"; 1990, *Newsbriefs*, vol. 2, No. 1, 3 pages.
Your're sending more than a payment: Point-of-Sale & Merchandising Support Advertising Materials, 2 pages.
"Company Profile: The Western Union Convenience Pay Service"; 2004, 4 pages.
"Your're sending more than a payment: You're sending peace of mind"; 2004, 3 pages.
"SBC Communications adds Western Union Locations for Walk-in Customer Bill Payments"; SBC News Release, 2 pages.
"Send Your Utility Bill Payment from Here!"; 3 pages.
"Rhode Island becomes first state to accept child support payments at Western Union: More than 50 Western Union Convenience Pay Agent Locations Offer New Level of Convenience to Rhode Island Residents Who Pay Child Support—"; 2002, 3 pages.
"Rhode Island becomes first state to accept child support payments at Western Union: Government Payment Leader govONE Solutions Adds Walk-in to Full Suite of Payment Options"; 2002, 3 pages.
"State of Hawaii to Accept Child Support Payments at Western Union"; 2004, 2 pages.
"Annual Report of the President of the Western Union Telegraph Company"; 1873, pp. 8-11.
"First located example of a money transfer"; Aug. 25, 1873, 1 page.
"Annual Report of the President of the Western Union Telegraph Company"; 1874, pp. 8-11.
"The Western Union Telegraph Company: Rules for Money Transfer Service"; 1908, pp. 3-25.
"The Western Union Telegraph Company: Delivery Department Instructions"; 1926, Commercial Bulletin No. 9-A, 2 pages.
"The Western Union Telegraph Company:Instructions for Receiving Clerks"; 1929, Commercial Bulletin No. 37-A, 2 pages.
"Annual Report of the Western Union Telegraph Company"; 1935, 2 pages.
"Dots and Dashes"; 1935, vol. 11, No. 9, 4 pages.
"Annual Report of the Western Union Telegraph Company"; 1940, pp. 9 and 22.

"Annual Report of the Western Union Telegraph Company"; 1947, 2 pages.
"Annual Report of the Western Union Telegraph Company"; 1949, 2 pages.
"Annual Report of the Western Union Telegraph Company"; 1951, 2 pages.
"Annual Report of the Western Union Telegraph Company"; 1953, 2 pages.
"Annual Report of the Western Union Telegraph Company"; 1954, 3 pages.
"Annual Report of the Western Union Telegraph Company"; 1973, 5 pages.
"Annual Report of the Western Union Telegraph Company"; 1974, 2 pages.
"Annual Report of the Western Union Telegraph Company"; 1978, 2 pages.
"Annual Report of the Western Union Telegraph Company"; 1981, 2 pages.
"Amex Money Order Dispenser"; 1990, The Nilson Report, 1 page.
"Quick Cash and Quick Collect: Western Union's money-movers"; 1990, Newsbriefs, vol. 2, No. 1, 3 pages.
"Western Union's Would-Be Rival"; 1990, American Banker, 1 page.
"American Express in New Ad Drive"; 1990, American Banker, 1 page.
"American Express Unit Introduces State-Of-The-Art Automated Money Order Dispenser"; 1990, Tri-State Food News, 1 page.
"Annual Report of the Western Union Corporation"; 1990, 4 pages.
"Collection by Money Transfer: MoneyGram Service Removes Time-Consuming Steps to Commercial Collections"; 1990, Collector, p. 36.
"Amex tests Moneygram"; 1990, Adnews, 1 page.
"Amex aims expansion strategy at local currency exchanges"; 1990, Crain's Chicago Business, 1 page.
"Sending Cash in a Flash"; 1990, Travel & Leisure, p. 42.
". . . And a Nine-Second Money Order Dispenser"; 1991, Post-News, vol. 17, No. 1, 1 page.
"Money-wire giants battle for business: Currency exchanges wooed"; 1991, Chicago Sun Times, 2 pages.
"Sending Cash in a Flash: There are more ways to do it than you might think"; 1991, 2 pages.
"Loved one stranded? Send Cash"; 1991, Akron Beacon Journal, 2 pages.
"Common Values: Uncommon Opportunities"; 1995, First Data Corporation Annual Report, 2 pages.
"Behind the Scenes of Life"; 1996, First Data Corporation Annual Report, 3 pages.
"First Data InfoSource Offers Database Analysis with DecisionScope"; 1996, First Data Corporation News Release, 2 pages.
First Data and Netscape Offering Internet Payment Processing Service; 1996, First Data Corporation News Release, 3 pages.
"CES/NaBANCO Introduces Stored Value Card Technology: Blockbuster Video is First Merchant Partner"; 1996, First Data Corporation News Release, 3 pages.
"First Data to Offer Card Profitability Software from HNC: Distribution Agreement Poised to Repeat Falcon Success";1996, HNC Software, Inc. News Release, 3 pages.
"VIPS Introduces MCSource to Managed Healthcare Industry"; 1996, VIPS Healthcare Information Systems News Release, 2 pages.
"Leading Provider of Transaction Card Processing Selects Connect Oneserver Software as a Solution for Advanced Internet Merchant Services: First Data Chooses OneServer as an Application to Deliver the Internet to Banks and Merchants"; 1996, press Release, 4 pages.
"Netscape Announces Netscape Livepayment to Facilitate Internet Commerce"; 1996, Netscape News Release, 4 pages.
"Strean, LitleNet, BBN, and KPMG Announce Industry-Wide Initiative to Enable Wide-Scale Software Electronic Commerce"; 1996, News Release, 6 pages.
"First Data and Netscape Announce Program to Help Businesses Establish Payment-Enabled Web Sites"; 1996, First Data Corporation News Release, 5 pages.
"FDR to Offer HNC Software's Real-Time Fraud Detection: New distribution Agreement to Benefit Card Banks"; 1996, First Data Resources News Release, 3 pages.
"First Data Aligns with CyberCash to Offer New Electronic Coin Service"; 1996, First Data Corporation News Release, 3 pages.
"First Data, First USA Paymentech, GE Capital Invest in First Virtual Holdings"; 1996, First Virtual Holdings Corporation News Release, 3 pages.
"Annual Report of First Data Corporation"; 1998, 3 pages.
"Annual Report of First Data Corporation"; 1999, 2 pages.
"American Express Introduces Automated Money Order Dispenser"; 1991, Professional Check Casher, 1 page.
"Western Union Payment Services, Bidpay and Quick Collect, Online Bill Payment, Online Auction Payments"; http://www.westernunion.com/info/osComparePayment.asp, 2 pages.
"About Western Union: Company History"; http://www.payment-solutions.com/history.html, 2 pages.
"Western Union Money Transfer Services, Send Money Online, Money Orders, Send Telegrams"; http://www.westernunion.com/info/osCompareMoneyMessage.asp, 2 pages.
"Quick Pay; The Convenient and reliable way to receive payments from customers worldwide"; http://www.payment-solutions.com/quickpay.html, 3 pages.
Quick Cash: A safe and reliable way to send funds around the world; http://www.payment-solutions.com/quickcash.html, 1 page.
"Signature Services: Helping financial institutions send funds faster"; http://www.payment-solutions.com/signature.html, 1 page.
"American Express Money Orders, Travelers Cheques Now on Sale"; 1936, Dots and Dashes, 2 pages.
List of Prepaid Services; http://www.westernunion.com/info/osComparePrePaid.asp. 1 page.
"Get your Collect Card"; 1939, Dots and Dashes, 2 pages.
Picture of Bill payment form or advertisement, 1 page.
"NTs Completes Merger with EDS Fleet Services; New First Data Unit Sets Sights on New Markets"; 1996, NTS Press Release, 3 pages.
Transfers require ID made by telephaph; 1895, Tariff Book, 4 pages.
American Greeting Cards Click-Through; 38 pages.
"MoneyZap.com Greeting Card Process Flow"; 2000, 2 pages.
"Western Union/Money Zap: Send and receive money easily over the internet"; http://www.moneyzap.com/main.asp, 23 pages.
"Western Union Gift Greetings"; 6 pages.
"PayPal: The way to send and receive money online"; 4 pages.
"Aeromexico and Western Union Partner to Offer a Cash Payment Option for Booking Airline Tickets"; 2004, Press Release, 2 pages.
"Western Union and Continental Airlines Introduce New Quick and Easy Cash Payment Option When Booking flights"; 2004, Press Release, 4 pages.
"Purchasing American Airlines Tickets Just Got Easier"; 2004, Press Release, 4 pages.
"LAN Airline Alliance Carriers and Western Union offer Travellers Additional Payment Options"; 2005, Press Release, 3 pages.
"Western Union Financial Services, Inc.: Benefits Quick Cash Agreement and Disclosure Statement"; 1998, 2 pages.
"Western Union Financial Services, Inc.: Cash Card Agreement and Disclosure Statement"; 1998, 2 pages.
"Federal Benefits Checks are Going Away-Don't Let Your Customers Go with Them: Announcing the Western Union Benefits Quick Cash Program"; 4 pages.
"Introducing the Western Union Cash Card Program": 1998, 2 pages.
"Western Union Creates Phone Card with BLT Technologies"; 1997; PR Newswire Association, 2 pages.
"AT&T Wireless to Offer Western Union SwiftPay as Replenishment Option for AT&T Free2Go Wireless Prepaid Customers"; 2001, PR Newswire Association, 2 pages.
"New Western Union SwiftPay Service Continues Expansion of Consumer-to-Business Payment Options"; 1999, PR Newswire Association, 2 pages.
"Western Union SwiftPay Selected by Sheakley Uniservice to Complete W-2 Reprint Transactions"; 2000, PR Newswire Association, 2 pages.
"Rhode Island becomes First State to Accept Child Support Payments at Western Union: More that 50 Western Union Convenience Pay Agent Locations Offer New Level of Convenience to Rhode Island Residents Who Pay Child Support"; 2002, Press Release, 3 pages.
"Rhode Island becomes First State to Accept Child Support Payments at Western Union: Government Payment Leader govONE Solutions Adds Walk-in to Full Suite of Payment Options"; 2002, Press Release, 3 pages.
"SBC Communications Adds Western Union Locations for Walk-In Customer Bill Payments"; 2005, Press Release, 2 pages.
"Western Union Money Orders More Popular Than Ever": 1942, Dots and Dashes, vol. 18, No. 3, 2 pages.
"Refund of Money Transfers"; 1913, Journal of the Telegraph, 2 pages.
Western Union Credit Card; 1915, 4 pages.
How money by phone was paid;; Money Transfer Service: Book of Rules and List of Offices; 1926, Western Union Telegraph Company, 3 pages.
"Pilgrims Started Thankgiving Custom"; Dots and Dashes, vol. 4, No. 11, 2 pages.
"The Yellow Blank is Correct for every social need"; 1930, Western Union Booklet, 2 pages.
"Last of the Pony Express Riders Tells His Story"; 1932, Dots and Dashes, vol. 8, No. 10, 2 pages.
"Nation Receives Time Over Western Union Network"; 1931, Dots and Dashes, vol. 7, No. 5, 2 pages.
"Collect your delinquent accounts by Telegraph"; 1933, Form 1229-A, 1 page.
"Reynolds Arcade was Western Union Birthplace"; 1933, Dots and Dashes, vol. 9, No. 8, 2 pages.
"Messenger Work Full of Adventure, Excitement"; 1933, Dots and Dashes, vol. 9, No. 11, 2 pages.
Shopping Order service and gift service; 1934, Western Union Telegraph Company, Money Order Book, 6 pages.
Money Orders by Phone; 1935, Fortune Magazine, 3 pages.
"The Yellow Blank: When, Why, How to use It"; 1934, 5 pages.
Money Order with confirmation; 1948, 1 page.
"Western Union Products and Services: a brief description"; 1960, 22 pages.
Survey of services; 1960, pp. 2-31.
Western Union News Supplement: Automatic travelers checks using Western Union; 1975, 2 pages.
Western Union New Supplement: Money Orders delivery through Mailgram: 1975, 2 pages.
Candygram payment service, 1 page.
Remittance for order sent via Western Union; 1933, 2 pages.
Western Union Telegraph Company; 1933, Money Order Message.
Gift: Money Order for something you really want: 1933, 1 page.
Holiday Greeting by Western Union; 1933, 1 page.
Western Union Money Transfer, Form 72-A, 1933, 1 page.
Western Union Foreign Transfer Order, Form 72-A, 1933, 1 page.
Western Union Domestic Transfer Order, Form 72-A, 1933, 1 page.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Shopping Order by Western Union, 1933, 1 page.
Western Union Shopping Order, 1933, 2 pages.
Western Union Hotel-Motel Reservation Service, 1 page.
bidpay.com: Whois search results; 2003, http://www.networksolutions.com/en_US/whois/results.jhtml;jsessionid+VZDZVYDD1J, 2 pages.
"billserv.com Launches bills.com, an internet Portal for Consumers to Pay All Bills Online at No Cost"; 2000, Business Wire, 2 pages.
First Data Acquires PaySys International; 2001, Press Release, 2 pages.
Luxury Brands LLC: WOrld Famous Brands at Liquidation Proces; http://www.auctionbytes.com/cab/pages/payment, 3 pages.
PayPal for the Palm; http://handheldnews.com/file.asp?ObjectID=5401, 2 pages.
PayPal.com Case Study; http://fox.rollins.edu/~slackman/PayPal.htm, 2003, 7 pages.
PayPal-News; http://www.ndrys.com/paypal.html, 2003, 3 pages.
Hoffman, Karen Epper; "PayPal Still Running Free"; 2003, Bank Technology News, 3 pages.
Latour, Almar; "PayPal Electronic Plan May be on the Money in Years to Come"; 1999, The Wall Street Journal, 2 pages.
Plotkin, Hal; "Beam Me up Some Cash"; 1999, Silicon Valley Insider, 3 pages.
Boneh, Dan: "Beaming Money by Email is Web's Next Killer App"; 1999, PR Newswire, 4 pages.
BidPay: Seller FAQs—Receiving Payments and Using the Money Order Service; 7 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Steiner, Ina: "Accepting Credit Cards When You Sell Items: ProPay and Billpoint Payment Services"; 2000 Auction Bytes, 4 pages.
Wermer, Sandra; "A million credit card transactions in five hours"; 1997, Primeur, 2 pages.
"PaySys signs up four Asian distributors"; 1997 Orlando Business Journal, 3 pages.
Products and Services for PaySys, 2 pages.
VisionPLUS Consumer Payment Solution Overview, 2 pages.
PaySys—company overview, 2 pages.
State of New York Banking Department: Staff Letters and Memoranda; 2000, http://www.banking.state.ny.us/Io000718.htm, 2 pages.
Wijnen, Rene; You've Got Money!; 2000, Bank Technology News, vol. 13, No. 6, 4 pages.

* cited by examiner

MAIL HANDLING EQUIPMENT AND METHODS

BACKGROUND OF THE INVENTION

This invention relates generally to the field of mail processing, and in particular to the processing of mail relating to financial institutions. More specifically, the invention relates to the organization of pages containing financial information, including any attached financial cards, along with any inserts so that they may be placed into an envelope for mailing to a recipient.

Credit cards play an important role in today's economy. To receive a credit card, a person typically fills out an application which is processed by a bank that will issue the card. If the application is approved, the card needs to be produced and sent to the requester. Banks often contract another company to produce and issue cards on their behalf. For example, one such company is First Data Merchant Services (FDMS).

To issue a card, the bank sends the information to FDMS, typically in electronic form. Using this information a card is embossed and initialized with the appropriate information. The card is then attached to a paper carrier and then placed into an envelope for mailing. Existing equipment for performing such steps are commercially available from Bowe, Augsberg, Germany. Optionally, a second sheet and one or more inserts may also be added prior to placement into the envelope.

Unfortunately, such equipment can be expensive, typically on the order of about $1 million. As such, this invention relates to other machines and techniques that may be used to process such media in a more cost efficient manner.

BRIEF SUMMARY OF THE INVENTION

The invention provides various equipment and techniques that may be used to facilitate the processing of mail, and in particular to mail comprising multiple sheets that are matched together prior to be inserted into an envelope, some of which may include a charging instrument, such as a credit card. The mail may also include various inserts that are selectively added to the matched pieces of mail prior to insertion into the envelope.

In one embodiment, a mail processing machine comprises a first holding location that is adapted to hold a stack of first pages. A card is coupled to each of the first pages, and each first page includes an identifier. The machine also includes a second holding location for holding a stack of second pages, with each second page also having an identifier. A first advancing mechanism is used to separately advance each first page from the stack, and a second advancing mechanism is employed to separately advance each second page from the stack. A first scanning device reads the identifier on each first page as the first page is advanced by the first advancing mechanism, and a second scanning device reads the identifier on each second page as the second page is advanced by the second advancing mechanism. Further, a controller is employed to control the first and second advancing mechanism to permit the first and second pages to be scanned by the first and second scanners and to match the first pages with the second pages if the identifier on one of the advanced first pages corresponds with the identifier on one of the advanced second pages.

Hence, with such a configuration, a stack of first sheets to which cards have been attached may be individually matched with sheets of a second stack simply by advancing one of the sheets from each stack, comparing their identifiers to confirm that they both correspond to each other, and then placing one of the sheets onto the other. In this way, the machine may be constructed as a relatively inexpensive machine while still having the ability to match first and second sheets.

The machine may also include a conveyor so that the first advancing mechanism may place one of the first pages onto the conveyor and so that the second advancing mechanism may place one of the second pages onto the first page if the identifiers correspond. Further, the machine may include a plurality of inserting locations that are adapted to hold inserts. A plurality of inserting mechanisms may be used to place selective ones of the inserts onto the first and second pages as they pass along the conveyor. For example, based on the identifiers, certain inserts may be selected to be added. The controller sends a signal to the appropriate inserting mechanism to add these inserts to the stack moving along the conveyor.

The machine may further include a stuffing mechanism that is adapted to place the first and the second pages along with any inserts into an envelope. A postage station may then be used to place postage onto the envelope.

Conveniently, the first pages and second pages may be pre-folded into three sections defined by two fold lines before being placed into the machine. This may be done in an automated manner by a separate machine. These pages may be vertically stacked so that the advancing mechanisms may advance the bottom page from each stack prior to reading each identifier. Alternatively, the second pages may be flat sheets that are scanned to read their identifiers. After scanning, equipment may be used to fold the flat sheets and place them on the conveyor with the corresponding first sheets.

The invention also provides a sensing system to sense whether a sheet has been grasped. Such a sensing system may find particular use with a mail processing system, as well as with any application where the proper number of sheets that have been grasped needs to be determined. The sensing system comprises a first arm having a first jaw and a second arm having a second jaw. The second jaw is pivotally coupled to the first jaw to permit a sheet to be grasped between the jaws. A distance sensing system is disposed to sense the distance between the first and second arms, and a processor is used to determine if a single sheet is disposed between the first and second jaws based on the distance measured by the distance sensing system. In this way, once a grasping mechanism has attempted to grasp the sheet, the sensing may be used to sense whether only a single sheet has been grasped.

In one aspect, the sensing system comprises a light source that is configured to direct light onto the second arm, and a light collector on the first arm that is adapted to collect light reflected from the second arm. Further, a calibration mechanism may be used to calibrate the processor once the sheet has been placed between the first and second jaws.

Conveniently, an alarm may be coupled to the processor to indicate if a single sheet has not been grasped. The processor may be configured to trigger the alarm if a certain tolerance range has been exceeded. For example, the tolerance may be one that is greater than about 10% above a calibrated distance.

If incorporated into a mail processing system, the mail processing system may include a conveyor so that the first and second jaws may release the sheet onto the conveyor based on a signal from the processor. Further, inserting locations may hold sheets of inserts that are to be grasped by the first and second jaws. The first arm may be coupled to a rotatable bar to rotate the first and second jaws toward and away from the sheets of inserts so that a single sheet may be grasped during each cycle.

DETAILED DESCRIPTION OF THE INVENTION

One aspect of the invention provides a mail processing machine that will find particular use with processing financial documents. Although particularly useful with such documents, it will be appreciated that the invention may be used with essentially any type of mail or other documents where two or more sheets need to be matched together in a systematic manner. In one specific application, the invention may be used to match one sheet that carries a financial card, such as a credit card, debit card, smart card, customer loyalty card or the like, with one or more additional sheets that need to be in the second mailing. For example, the second sheet may have information, such as the cardholder's name, account number, terms and conditions of the credit card, targeted communications, and the like. Because the information on each of the sheets is tied to the card being mailed, the sheets are specific to the card holder and need to be properly matched prior to sending. To facilitate such matching, each sheet may include a unique identifier, such as a bar code label. Each bar code is then read prior to matching the sheets from each group to make sure each sheet is tied to the card being issued.

Techniques for matching such cards may in some cases employ a relatively expensive machine, typically on the order of about one million dollars, that prints the sheets of each group, attaches cards to the first group of sheets, folds the sheets, prints the sheets of each additional group and folds that group, and then matches the sheets of each group. The machine may further add inserts to the matched sheets, place them into an envelope, and prepare them for mailing. One example of such a machine is described in, for example, copending U.S. application Ser. No. 10/36653 filed on the same date as the present application, the complete disclosure of which is herein incorporated by reference.

Machines according to the present invention are configured to take groups of pre-printed sheets that already have cards attached and that are folded, along with groups of second sheets that are also pre-printed and folded. These groups of sheets are then processed to match the appropriate first sheet with the appropriate second sheet, add any inserts, stuff them into an envelope and prepare them for mailing. Alternatively, the second sheets may comprise flat sheets that are folded with folding equipment just prior to being matched with the associated flat sheet.

In this way, the machine may be manufactured at a fraction of the cost and may serve as a back-up machine in the event that a fully automated machine breaks down or is taken off line. Instead of include expensive components needed to print sheets, match cards with sheets, and perform folding operations, the machine of the invention may take stacks of such sheets that have already been produced and then complete the final processing steps as described above.

Figure 1:
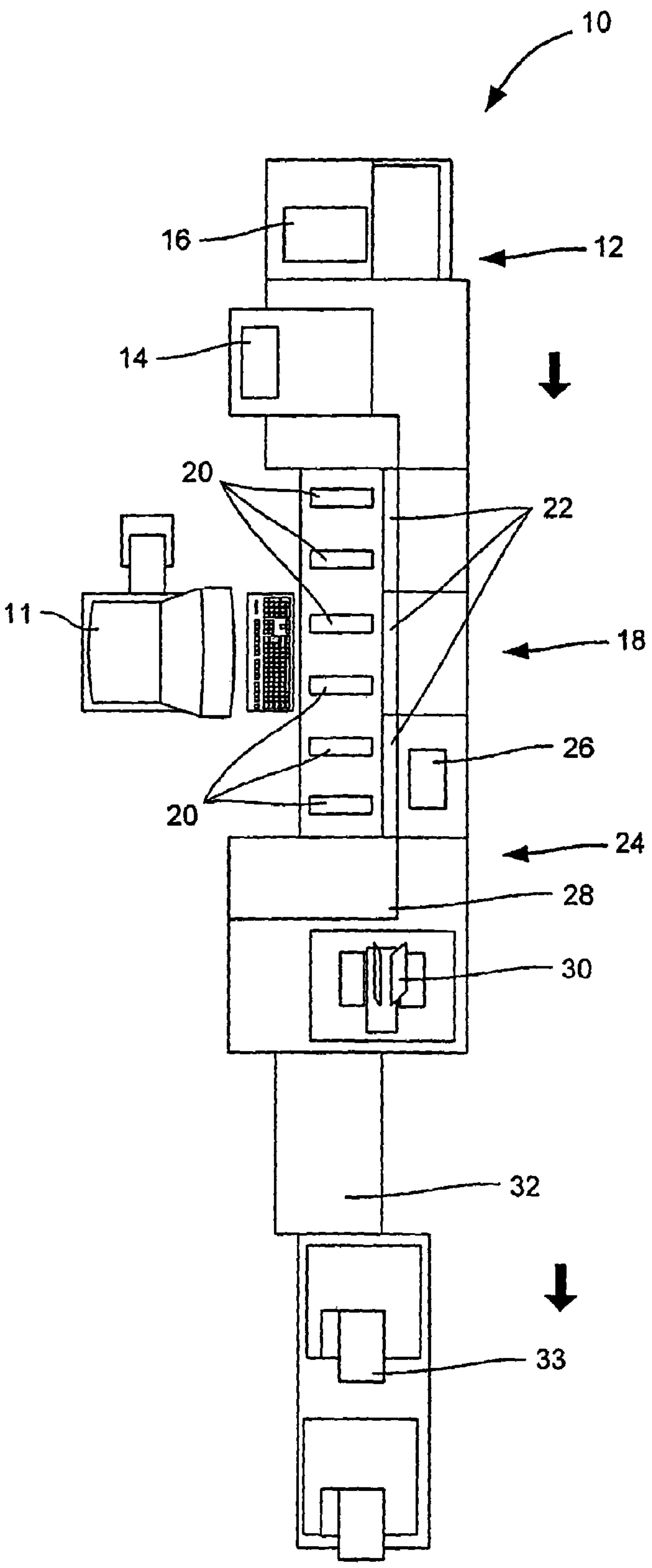
FIG. 1 is a top schematic view of one embodiment of a mail processing machine according to the invention.

Referring now to FIG. 1, one embodiment of such a mail processing machine 10 will be described. Machine 10 comprises a central computer 11 for controlling its operations. Machine 10 also includes a matching section 12 that is configured to match first sheets that each have a card with a corresponding second sheet. Matching section 12 has a first holding location 14 for holding pre-folded first sheets that each have a card and a corresponding bar code. Matching section 12 further includes a second holding location 16 for holding pre-folded second sheets that also have a bar code. As described in greater detail hereinafter, one sheet from each of the holding locations is advanced and its bar code scanned to ensure that the two sheets are to be matched. If so, they are stacked onto a conveyor that extends along machine 10. Alternatively, second holding location 16 may be modified to hold flat sheets and may be placed downstream of first holding location 16. Second holding location 16 may include equipment to scan the bar code on the flat second sheets, fold the second sheets, and then place them on top of the corresponding first sheets that pass along the conveyor. The conveyor may be configured to advance specified lengths so that upon each advancement another second sheet is placed onto the corresponding first sheet that rests on the conveyor. Examples of such fold equipment that may be used include feeder/folding machines available from GBR, Germany and Lorente, Brazil. First holding location 14 may be constructed of a feeder, such as a Longford feeder, available from Longford Int.

The matched sheets then pass through an inserting section 18 having various insert feeders 20 for holding different inserts. Conveniently, inserting section 18 may be covered by clear door covers 22. As the matched sheets pass through inserting section 18, inserts from feeders 20 may be selectively added depending on certain pre-defined relationships that are stored in computer 11. For example, a profile may exist for the cardholder that is to receive the card. Based on this profile, computer 11 may select appropriate inserts for that card holder. For instance, if the cardholder's profile indicates a preference for playing golf, the insert may be an advertisement for a golf vacation.

After the appropriate inserts have been added, the matched sheets (and any inserts) pass along the conveyor to an envelope stuffing section 24 having an envelope feeder 26 and an envelope opener 28. The envelopes are opened by opener 28 and a mechanism is used to move the matched sheets from the conveyor and into the envelope. The envelope is then sealed and is flipped using a flipping mechanism 30 onto another conveyor 32. The envelopes are then inserted into a postage meter 33 where they are stamped with the appropriate postage. The envelopes are then ready for mailing.

Figure 2:
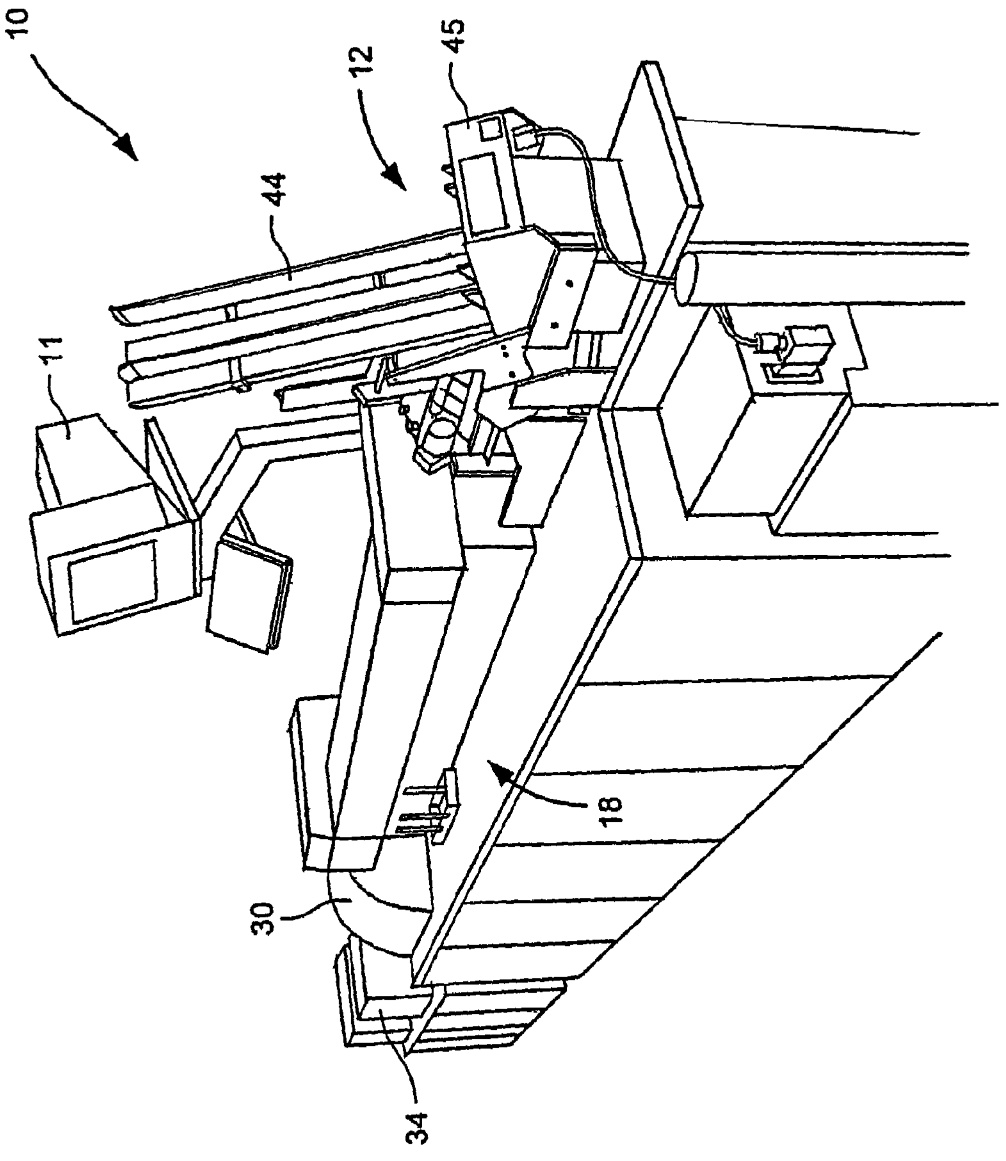
FIG. 2 is front perspective view of the mail processing machine of FIG. 1.
Figure 3:
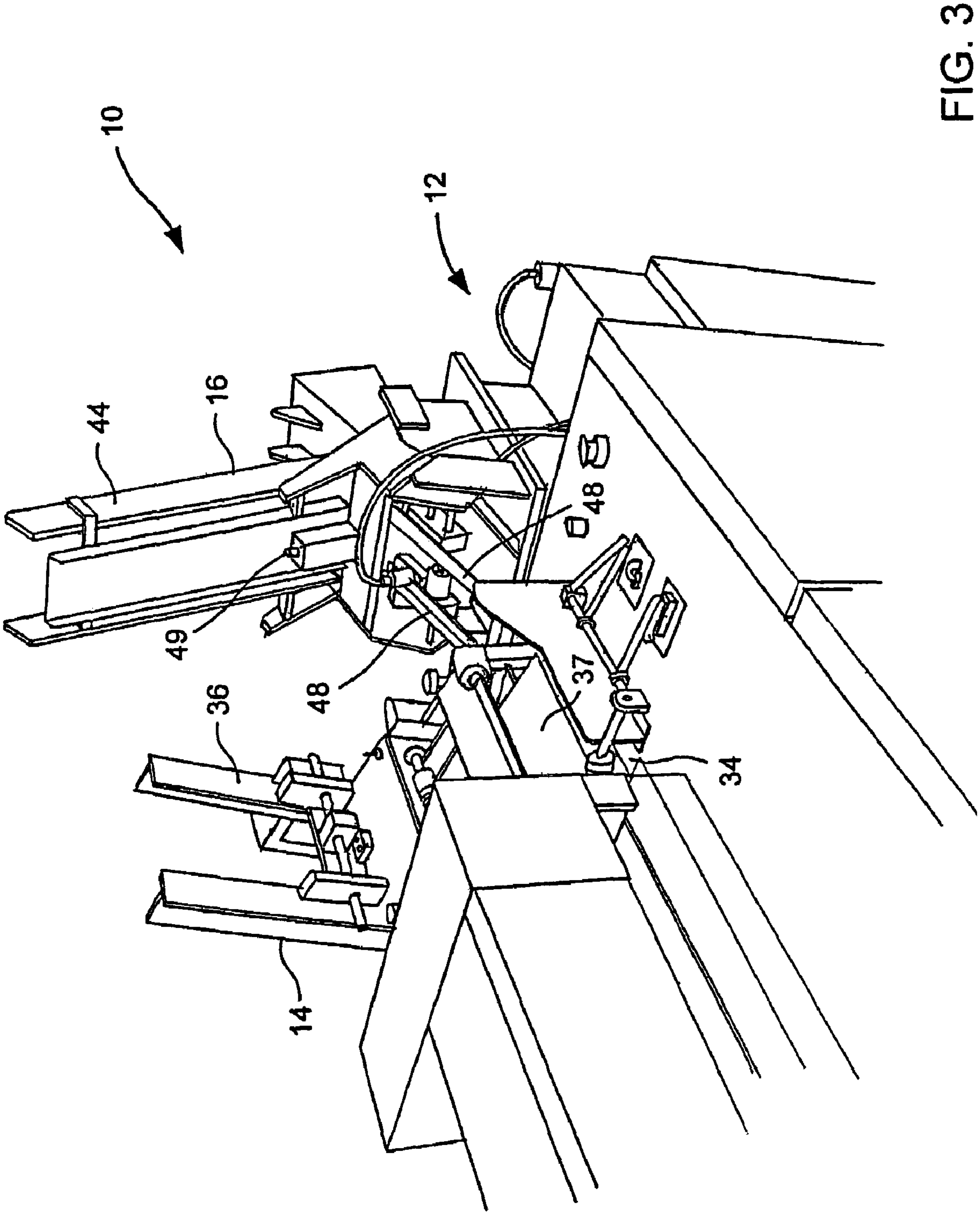
FIG. 3 is a rotated view of the mail processing machine of FIG. 2 showing first and second holding locations for holding stacks of first and second sheets.
Figure 4:
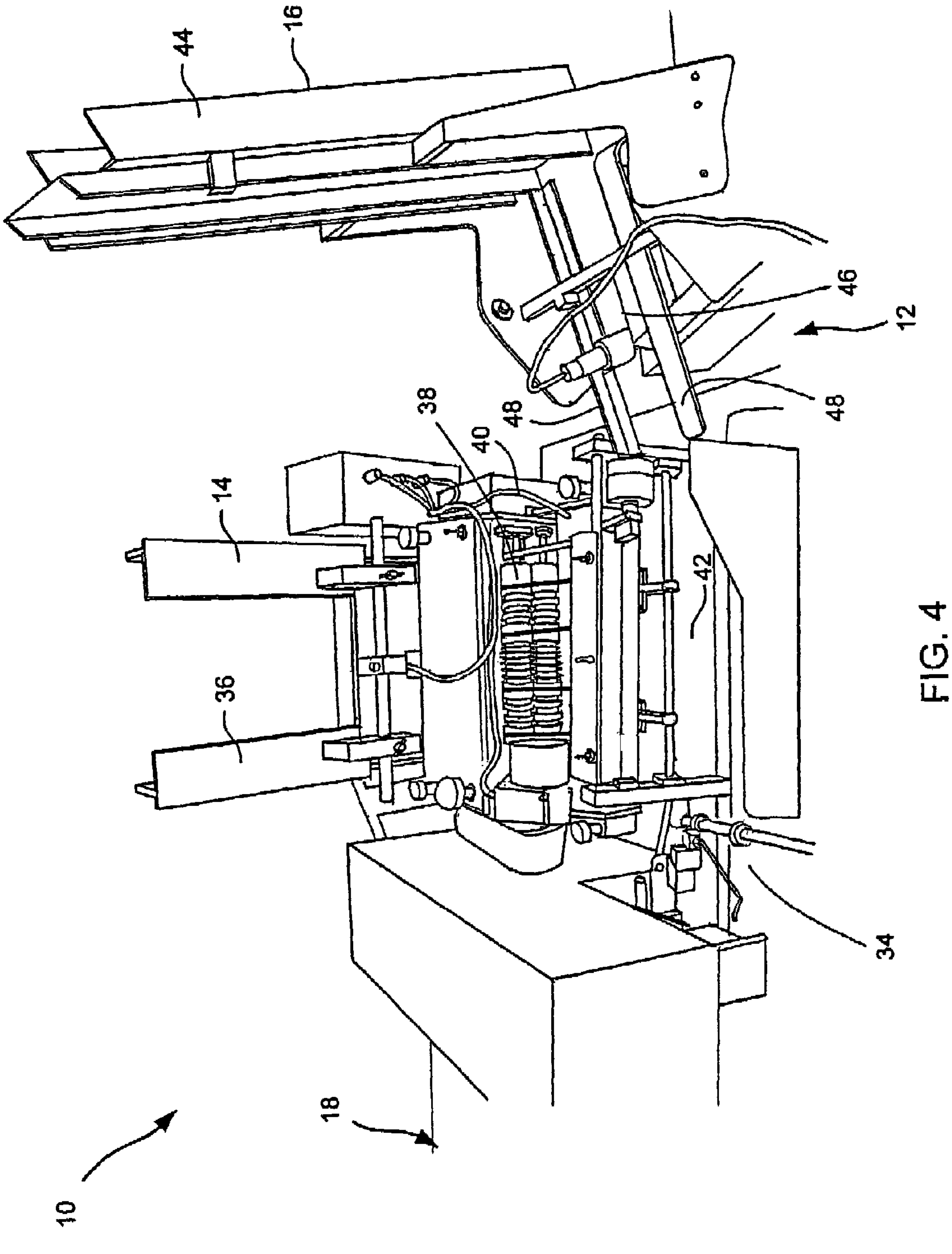
FIG. 4 is a front view of the first and second holding locations of FIG. 3.

Referring now to FIGS. 2-4, matching section 12 will be described in greater detail. Matching section 12 includes a conveyor 34 for receiving sheets from first holding location 14 and second holding location 16. Conveyor 34 is used to move the matched sheets along through inserting section 18 as previously described.

Disposed above conveyor 34 is a holder 36 for holding a stack of pre-folded first sheets. As previously described, these first sheets may also include a pre-attached card and a bar code identifier. These sheets may each have a Z-fold, although other folding arrangements may be used. The stack of first sheets rests upon a roller (hidden from view) that advances a bottom most sheet 37 (see FIG. 3) from the stack where it is fed between a pair of rollers 38 and 40. Sheet 37 is advanced over a bar code scanner 42 that reads the bar code and passes this information to computer 11. After being scanned, first sheet 37 falls onto conveyor 34.

Second holding location 16 includes a holder 44 for holding a stack of second sheets that are to be matched with the first sheets in holder 36. The second sheets are also pre-folded, such as with a Z-fold, and also each include a bar code that may be read to ensure that the correct second page is matched with the first page. As previously described, the second sheets may be flat and then folded just prior to being placed onto the conveyor. As best shown in FIG. 2, an advancing mechanism 45 having a roller is used to advance the bottom most page of the stack of second sheets over a scanner 46 that reads the bar code on the second sheet. This information is passed to computer 11 that compares the bar code with that of first sheet 37 that has just been placed onto conveyor 34. The second sheet slides along tracks 48 and falls onto the first sheet.

If the two bar codes correspond, the matched sheets continue along conveyor 34 to inserting section 18. If not, an alarm is produced and any further processing is stopped. The alarm may be audible, visual or a combination of both. For example, as shown in FIG. 3, a light 49 may be lit if the sheets do not correspond.

Once the initial first and second sheets have been matched, the process is repeated so that a continuous stream of matched first and second sheets are placed onto conveyor 34 and then advanced to inserting section 18 where appropriate inserts are added as previously described.

Hence, matching section 12 permits pre-printed and pre-folded sheets to be matched and then prepared for receiving additional inserts in a rapid and cost effective manner. As such, machine 10 may be used as a back-up machine for a fully automated machine. Further, it will be appreciated that machine 10 may be operated without the use of second sheets. In this way, machine 10 functions as an intelligent inserter to place inserts with appropriate first sheets that contain the card.

Figure 5:
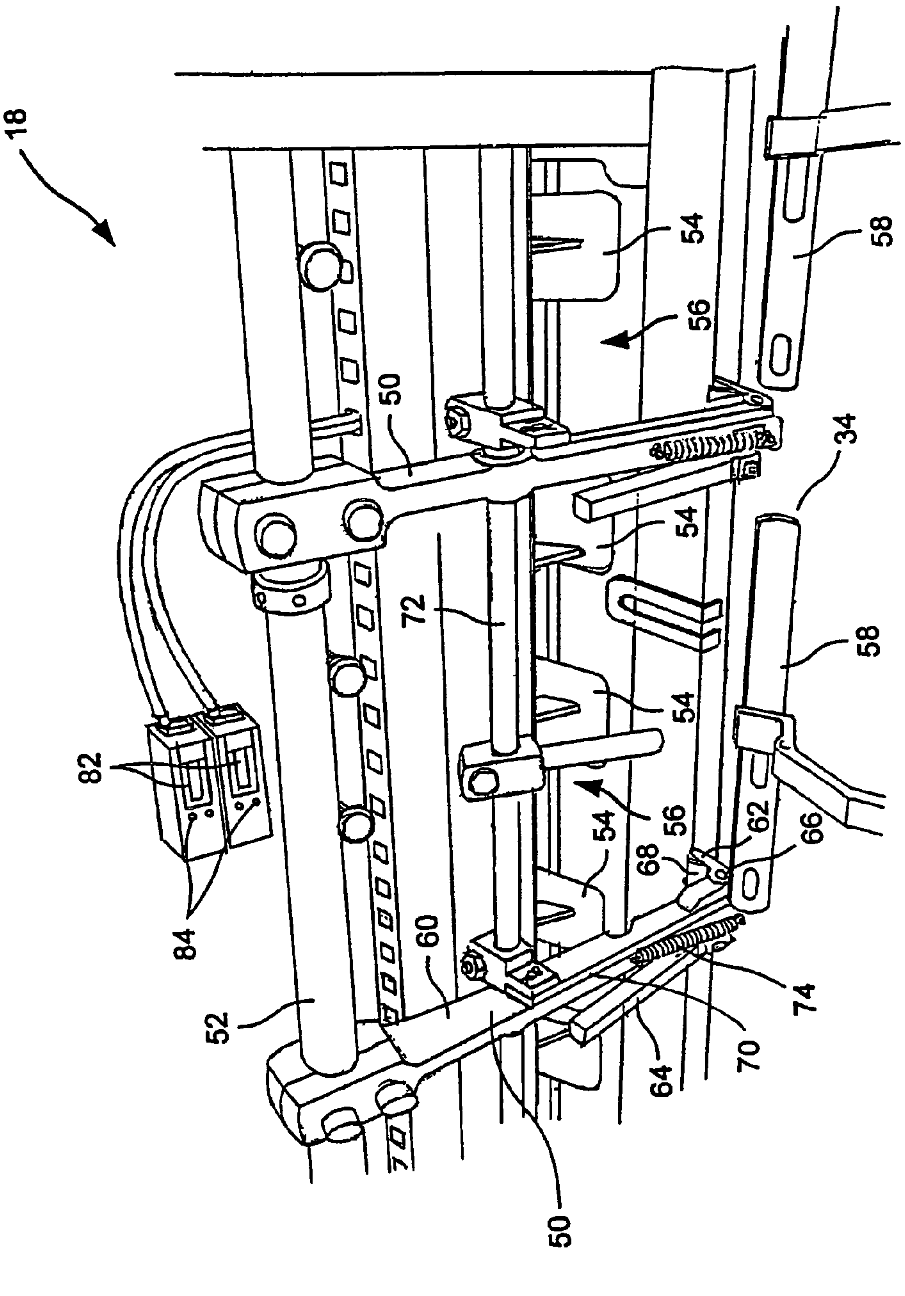
FIG. 5 a front perspective view of an inserting section of the machine of FIG. 1 showing a sensing system.
Figure 6:
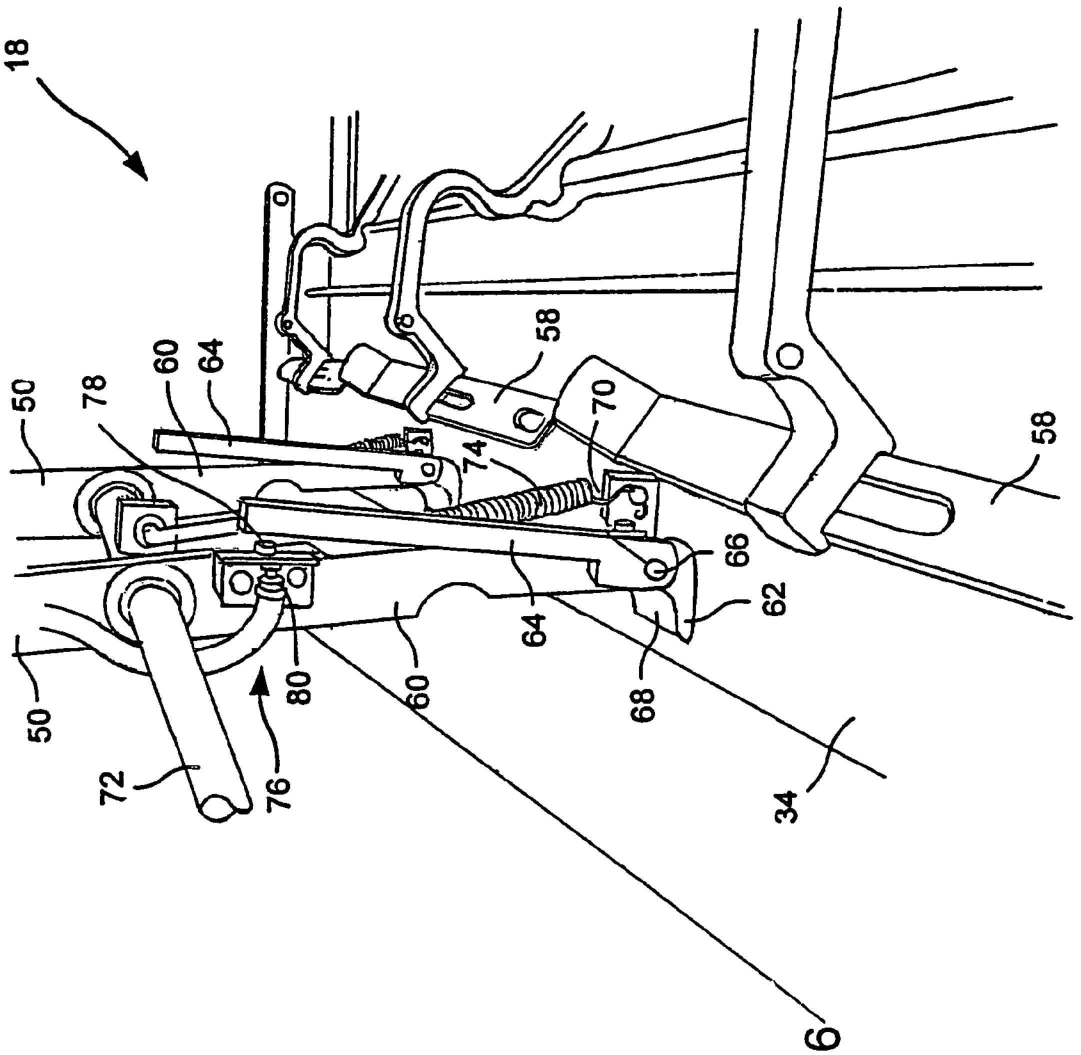
FIG. 6 is a side view of a grasping mechanism having the sensing system of FIG. 5.

Referring now to FIGS. 5 and 6, inserting section 18 will be described in greater detail. As previously described, conveyor 34 passes through inserting section 18 to permit various inserts to be selectively placed onto the matched sheets passing along conveyor 34. The inserts are stacked within insert feeders 20 (see FIG. 1). A bottom one of each insert is advanced toward conveyor 34 so that it may be grasped by grasping mechanisms 50 when an appropriate signal is given by computer 11 (see FIG. 1). Each grasping mechanism 50 is coupled to a bar 52 that rotates clockwise and counter clockwise in an alternating manner to move grasping mechanisms 50 toward and away from the advanced insert. Conveniently, the advanced insert may rest on a track 54 having a slot 56 to permit grasping mechanism 50 to grasp the insert if needed. If an insert is grasped, it may be released on the back swing to drop the insert onto the matched sheets on conveyor 34. Conveniently, top rails 58 may be moved on top of the matched pages and any inserts to hold the stacks in place as they are moved along conveyor 34.

Each grasping mechanism 50 comprises a first arm 60 that is coupled to bar 52 and a first jaw 62 extending from first arm 60. A second arm 64 is pivotally coupled to first arm 60 at a pivot point 66, and a second jaw 68 is coupled to second arm 64. A moving arm 70 is also coupled to second jaw 68 and serves to pivot second jaw 68 about pivot point 66 to move second jaw 68 toward and away from first jaw 62. Moving arm 70 is also coupled to a second bar 72 that is rotated to move moving arm 70 back and forth. In this way, the two jaws may be moved relative to each other simply by rotating bar 72. A spring 74 may be used to bias jaws 62 and 68 together. Computer 11 may be configured to send an appropriate signal to move bar 72.

In operation, bar 50 is continuously rotated in an alternating direction to move jaws 62 and 68 toward and away from slots 56, with jaws 62 and 68 being separated from each other. If computer 11 indicates that an insert is to added to the sheets on conveyor 34, bar 72 is rotated to cause jaws 62 and 68 to close once they have passed over an insert. As grasping mechanism 50 swings back, the grasped insert passes over conveyor 34 and bar 72 is rotated in an opposite direction to release the insert which falls onto the matched sheets on conveyor 34.

In order to ensure that only a single sheet has been grasped, grasping mechanism 50 may include a distance sensing system 76 that is best illustrated in FIG. 6. Sensing system 76 comprises a light source 78 and a light collector 80 on first arm 60. Light source 78 shines light onto second arm 64 and light collector 80 collects the reflect light. Exemplary light sources and light collectors are Keyence detectors, commercially available from CED Automation and Electrical Controls. Computer 11 is able to measure the time required for the light to reflect back. Based on this time, the distance between collector 80 and second arm 64 may be determined. Because second arm 64 moves relative to first arm 60, the distance between jaws 62 and 68 may be determined after calibration of sensing system 76. One way to calibrate system 76 is to place a single sheet between jaws 62 and 68 and to permit jaws 62 and 68 to compress the sheet using essentially the same force used in normal operation. This distance may conveniently be displayed on a display screen 82 (see FIG. 5). A calibration button 84 may then be pressed to calibrate the system. Computer 11 may be programmed to indicate that a single sheet has not been grasped (either no sheet or more than one sheet) if the calibrate distance exceeds a certain threshold. For example, the error may be indicated if the measured distance is 10% greater or smaller than the calibrated distance. If so, machine 10 may be stopped to permit the insert to be manually added.

The invention has now been described in detail for purposes of clarity and understanding. However, it will be appreciated that certain changes and modifications may be practiced within the scope of the appended claims.

What is claimed is:

1. A mail processing machine, comprising:

a first holding location that is adapted to hold a stack of first pages, wherein a card is coupled to each of the first pages, and wherein each first page includes an identifier;

a second holding location that is adapted to hold a stack of second pages, and wherein each second page includes an identifier;

an advancing system that is adapted to advance each first page along with its attached card from its stack and each second page from its stack;

a scanning system that is adapted to read the identifiers on each first page and each second page as they are advanced using the advancing system;

a controller that is configured to control the advancing to permit the first and second pages to be scanned by the scanning system and to match the first pages with the second pages if the identifier on one of the advanced first pages corresponds with the identifier on one of the advanced second pages.

2. A machine as in claim 1, further comprising a conveyor, wherein the advancing system is configured to place one of the first pages onto the conveyor, and to place one of the second pages onto the first page if the identifiers are corresponding.

3. A machine as in claim 2, further comprising a plurality of inserting locations that are adapted to hold inserts, and a plurality of inserting mechanisms that are adapted to place selective ones of the inserts onto the first and second pages as they pass along the conveyor.

4. A machine as in claim 3, wherein the controller is configured to operate the inserting mechanisms to place the inserts based on the identifiers on the first and second pages.

5. A machine as in claim 3, further comprising a stuffing mechanism that is adapted to place the first and the second pages along with any inserts into an envelope.

6. A machine as in claim 5, further comprising a postage station that is adapted to place postage onto the envelope.

7. A machine as in claim 1, wherein the first holding location is adapted to hold the first pages when the first pages are pre-folded into three sections defined by two fold lines.

8. A machine as in claim 1, wherein the second holding location is adapted to hold the second pages when the second pages are flat or are pre-folded into three sections defined by two fold lines.

9. A machine as in claim 1, wherein the first holding location is adapted to hold the first pages in a vertical stack, and wherein the advancing system is adapted to advance a bottom one of the first pages.

10. A machine as in claim 1, wherein the second holding location is adapted to hold the second pages in a vertical stack, and wherein the advancing system is adapted to advance a bottom one of the second pages.

11. A method for processing mail, the method comprising:
- placing a stack of first pages into a first holding location, wherein a card is coupled to each of the first pages, and wherein each first page includes an identifier;
- placing a stack of second pages into a second holding location, wherein each second page includes an identifier;
- advancing one of the first pages along with its attached card from the stack using an advancement system;
- advancing one of the second pages from the stack using the advancement system;
- scanning the advanced first page with a scanning system to read the identifier on the first page;
- scanning the advanced second page with the scanning system to read the identifier on the second page; and
- determining with a controller is the identifiers on the advanced first and second pages correspond; and
- matching the advanced first and second pages if the identifier correspond.

12. A method as in claim 11, wherein the matching step comprising placing the first and second sheets in a stack onto a conveyor.

13. A method as in claim 12, wherein the advancing system is configured to place the advanced first page onto the conveyor, and to place the advanced second page onto the first page to stack the first and second pages onto the conveyor.

14. A method as in claim 13, further comprising selectively placing inserts from a plurality of inserting locations onto the first and second pages as they pass along the conveyor.

15. A method as in claim 14, further comprising placing the inserts using inserting mechanisms, and further comprising controlling operation of the inserting mechanisms based on the identifiers on the first and second pages.

16. A method as in claim 14, further comprising placing the first and the second pages along with any inserts into an envelope using a stuffing mechanism.

17. A method as in claim 16, further comprising placing postage onto the envelope.

18. A method as in claim 11, wherein the first pages are pre-folded into three sections defined by two fold lines when held in the first holding location.

19. A method as in claim 11, wherein the second pages are flat or are pre-folded into three sections defined by two fold lines when held in the second holding location.

20. A method as in claim 11, wherein the first pages are held in a vertical stack, and wherein the advanced first page is a bottom one of the first pages.

21. A method as in claim 11, wherein the second pages are held in a vertical stack, and wherein the advanced second page is a bottom one of the second pages.

22. A mail processing machine, comprising:
- a first holding location that is adapted to hold a stack of first pages, wherein a card is coupled to each of the first pages, and wherein each first page includes an identifier;
- a second holding location that is adapted to hold a stack of second pages, and wherein each second page includes an identifier;
- an advancing system that is adapted to advance each first page from its stack and each second page from its stack;
- a scanning system that is adapted to read the identifiers on each first page and each second page as they are advanced using the advancing system;
- a controller that is configured to control the advancing to permit the first and second pages to be scanned by the scanning system and to match the first pages with the second pages if the identifier on one of the advanced first pages corresponds with the identifier on one of the advanced second pages;
- a conveyor, wherein the advancing system is configured to place one of the first pages onto the conveyor, and to place one of the second pages onto the first page if the identifiers are corresponding; and
- a plurality of inserting locations that are adapted to hold inserts, and a plurality of inserting mechanisms that are adapted to place selective ones of the inserts onto the first and second pages as they pass along the conveyor.

23. A method for processing mail, the method comprising:
- placing a stack of first pages into a first holding location, wherein a card is coupled to each of the first pages, and wherein each first page includes an identifier;
- placing a stack of second pages into a second holding location, wherein each second page includes an identifier;
- advancing one of the first pages from the stack using an advancement system;
- advancing one of the second pages from the stack using the advancement system;
- scanning the advanced first page with a scanning system to read the identifier on the first page;
- scanning the advanced second page with the scanning system to read the identifier on the second page; and
- determining with a controller is the identifiers on the advanced first and second pages correspond; and
- matching the advanced first and second pages if the identifier correspond;
- wherein the matching step comprising placing the first and second sheets in a stack onto a conveyor; and
- wherein the advancing system is configured to place the advanced first page onto the conveyor, and to place the advanced second page onto the first page to stack the first and second pages onto the conveyor.

* * * * *